US008091167B2

(12) United States Patent
Teo et al.

(10) Patent No.: US 8,091,167 B2
(45) Date of Patent: Jan. 10, 2012

(54) SYSTEMS AND METHODS FOR CONTACTLESS AUTOMATIC DUST REMOVAL FROM A GLASS SURFACE

(75) Inventors: Wee Kian Teo, Singapore (SG); Kai Leong Wong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 408 days.

(21) Appl. No.: 12/022,555

(22) Filed: Jan. 30, 2008

(65) Prior Publication Data

US 2009/0190219 A1 Jul. 30, 2009

(51) Int. Cl.
*A47L 13/40* (2006.01)
*G03B 17/00* (2006.01)

(52) U.S. Cl. .......................... 15/1.51; 396/439; 359/507

(58) Field of Classification Search .................. 359/507; 96/54, 75–79; 399/98–106; 396/439, 661
See application file for complete search history.

(56) References Cited

U.S. PATENT DOCUMENTS 3,694,655 A * 9/1972 Auer ............................ 250/389
4,662,903 A 5/1987 Yanagawa ....................... 55/126
4,689,056 A * 8/1987 Noguchi et al. .................. 96/79
4,715,870 A 12/1987 Masuda et al. .................. 55/132
4,734,105 A * 3/1988 Eliasson et al. .................... 95/62
4,750,921 A 6/1988 Sugita et al. ..................... 55/132
5,055,118 A * 10/1991 Nagoshi et al. ................... 96/88
5,527,851 A 6/1996 Barron et al. .................. 524/437
5,666,605 A * 9/1997 Tokimatsu et al. ........... 399/173
RE36,018 E 12/1998 Abe et al. ...................... 396/382
6,076,216 A * 6/2000 Biryukov ....................... 15/1.51
6,640,065 B1 * 10/2003 Yuge ............................ 399/100
6,911,593 B2 * 6/2005 Mazumder et al. ........... 136/251
7,014,688 B2 * 3/2006 Griffiths et al. ................... 96/67
7,398,035 B2 * 7/2008 Zona et al. .................... 399/168
2007/0212058 A1 * 9/2007 Kawai .......................... 396/429

FOREIGN PATENT DOCUMENTS

JP 2004184949 A * 7/2004

* cited by examiner

*Primary Examiner* — Mark Consilvio
(74) *Attorney, Agent, or Firm* — Baker Botts L.L.P.

(57) ABSTRACT

An imaging device for automatic dust removal is provided. The imaging device may include a glass layer and an electrostatic particle removal system associated with the glass layer. The electrostatic particle removal system may include an induction layer configured to induce a charge to a particle located between the glass layer and the electrostatic particle removal system, a field grid layer configured to provide an electric field for moving the charged particle, and a collector configured to collect the charged particle moved by the electric field.

17 Claims, 5 Drawing Sheets

SYSTEMS AND METHODS FOR CONTACTLESS AUTOMATIC DUST REMOVAL FROM A GLASS SURFACE

TECHNICAL FIELD

The present disclosure relates in general to particle removal, and more particularly to systems and methods for contactless automatic dust removal.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include one or more peripheral devices communicatively coupled thereto. In general, a peripheral device may include hardware coupled to an information handling system in order to expand the information handling system's capability or function. A peripheral device may include devices internal to the information handling system chassis or case, as well as devices external to the information handling system chassis or case. A peripheral device may include, without limitation, a storage device (e.g., CD-ROM, CD-RW, CD-R, DVD-ROM, DVD-RW, DVD-R, USB storage device, tape drive, floppy disk, hard disk drive, disk array controller), an input device (e.g., keyboard, pointing device, microphone, image scanner, webcam, barcode reader), and/or an output device (e.g., printer, sound card, speakers, graphics card, monitor, docking station).

Printers, copiers, and/or scanners (collectively, digital imaging devices) coupled to an information handling system may be used to input and/or output images to and/or from the information handling system. However, these digital imaging devices may trap dust particles (e.g., paper fiber) or other impurities (e.g., toner residue) that may affect the quality of the image being printed, copied, or scanned.

A conventional method for removing dust particles and other impurities on or under a glass surface of an imaging device may include using a physical cleaning mechanism such as a brush to remove the impurities. However, the brush may scratch the surface of the glass, which may affect the quality of the image being produced. Further, a brush may not substantially or completely remove the particles and impurities. In some cases, the dust particles and impurities are brushed to a location outside of the imaging area. Such a solution may be temporary, as the particles and impurities may migrate back into the imaging area.

Accordingly, improved systems and methods for removing particles and impurities in digital imaging devices are desired.

SUMMARY

In accordance with an embodiment of the present disclosure, an imaging device may include a glass layer and an electrostatic particle removal system associated with the glass layer. The electrostatic particle removal system may include an induction layer configured to induce a charge to a particle located between the glass layer and the electrostatic particle removal system, a field grid layer configured to provide an electric field for moving the charged particle, and a collector configured to collect the charged particle moved by the electric field.

In another embodiment, a method includes inducing a charge to a plurality of particles located between a glass layer of an imaging device and an electrostatic particle removal system, generating a moving electric field to move the charged particles, and collecting the charged particles moved by the moving electric field.

In another embodiment, a method includes applying a charge to an induction grid for charging a plurality of particles, applying a voltage to a plurality of electrodes of a field grid to generate an electric field for moving the charged particles, and applying a voltage to a collector base to attract the charged particles moved by the electric field.

Various technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1A through 9, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

For the purposes of this disclosure, an imaging device may include an information handling system or any device associated with an information handling system for processing (e.g., printing, copying, scanning, faxing, or otherwise processing) one or more images. For example, an imaging device may include a printer for outputting images (e.g., a text or image file from a document, a website, a file, a picture, etc.) from an information handling system. In other embodiments, the imaging device may comprise a copier for producing one or more copies of an image (e.g., a document). As another example, an imaging device may be a scanner for digitizing an image (e.g., a picture, a document, etc.) and/or providing the digitized image as input to an information handling system. In certain embodiments, the imaging device may be a combination of a copier, a scanner, and/or a printer.

Figure 1A:
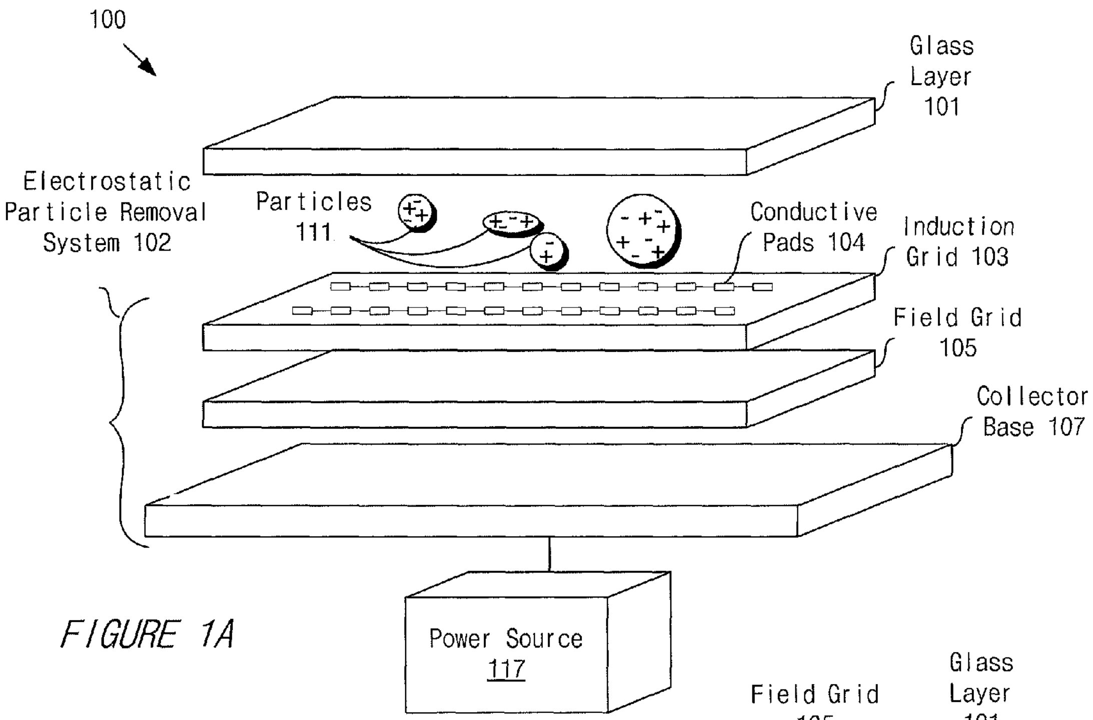
FIG. 1A illustrates an example contactless, non-mechanical apparatus for removing particles from an imaging device, in accordance with embodiments of the present disclosure.

FIG. 1A illustrates a contactless, non-mechanical apparatus 100 for removing particles from an imaging device, in accordance with embodiments of the present disclosure. Apparatus 100 may include an electrostatic particle removal system 102 associated with a glass layer 101 of an imaging device, where the system may be used to remove particles 111 (e.g., dust or paper particles, toner residue, or other impurities) located between glass layer 101 and electrostatic particle removal system 102. Apparatus 100 may also include a power source 117 coupled to electrostatic particle removal system 102.

Glass layer 101 may be an interface between an image and/or document and a printing, copying, and/or scanning apparatus that may print, copy, and/or scan the image and/or document. Glass layer 101 may be formed from glass, plexiglass, plastic, or other at least partially transparent material.

Particles 111 located between glass layer 101 and electrostatic particle removal system 102 may include particles with various inherent and/or non-inherent electric charges. For example, particles 111 may include neutrally charged particles, e.g., particles that include an equal number of positive and negative charges.

Electrostatic particle removal system 102 may include an induction grid 103, a field grid 105, and a collector base layer 107. In some embodiments, electrostatic particle removal system 102 may be spaced apart from glass layer 101, e.g., by about 3 millimeters. The distance between electrostatic particle removal system 102 and glass layer 101 may vary, and the further the distance between system 102 and glass layer 101, the higher the induction charge voltage required for providing an electrostatic charge to particles 111.

Induction grid 103 may be formed from any material that may provide an electrostatic charge to particles 111. Induction grid 103 may include conductive pads 104 coupled to power source 117, which may apply a pulse, AC sinusoidal, and/or other voltages to the conductive pads 104. In some embodiments, power source 117 may comprise the power source of the imaging device. Alternatively, power source 117 may comprise a DC and/or AC power source coupled to apparatus 100 for providing voltages to the components of apparatus 100.

In addition or alternatively, particles 111 may also be charged by field grid 105. Power source 117 coupled to electrodes 115 of field grid 105 may charge particles located between glass layer 101 and system 102. Components of field grid 105, including electrodes 115, are described in more detail below with respect to FIGS. 2, 3A, and 3B.

After particles 111 are charged by induction grid 103 and/or field grid 105, field grid 105 may generate a moving electric field (E-field) to move particles 111 in a direction of the moving E-field until particles 111 may be collected by collector base 107.

Figure 1B:
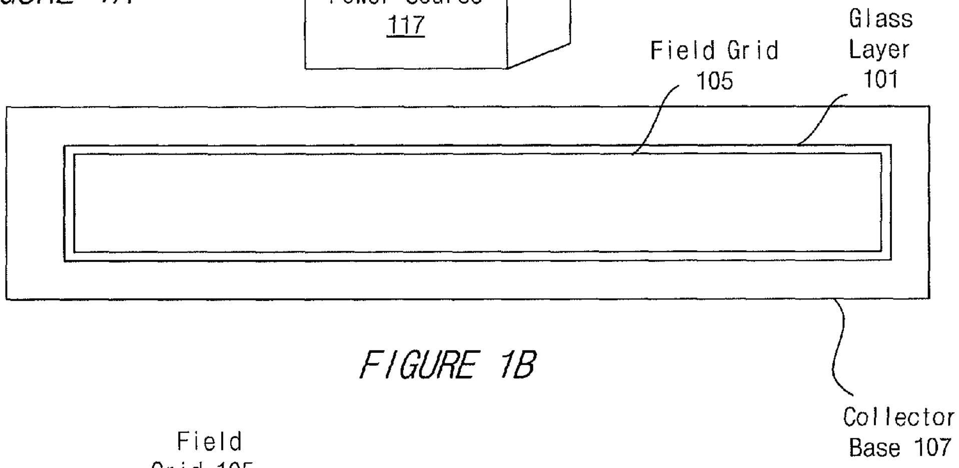
FIG. 1B illustrates a top-down view of the apparatus of FIG. 1A, in accordance with embodiments of the present disclosure.

After particles 111 are charged by induction grid 103 and/or field grid 105 and moved by an E-field generated by field grid 105, particles 111 may be collected at collector base 107. In some embodiments, collector base 107 may extend beyond or surround induction grid 103 and/or field grid 105 such that particles 111 may be moved outside an edge or perimeter of induction grid 103 and/or field grid 105 and collected by collector base 107. For example, FIG. 1B shows a top-down view of the embodiment of FIG. 1A, in which collector base 107 surrounds the outer perimeter of field grid 105, such that particles 111 may be moved beyond any edge of field grid 105 and collected by collector base 107. In some embodiments, collector base 107 may comprise a static charge pad that attracts charged particles 111 to help attract particles 111. A voltage provided by power source 117 or other voltage source may be applied to collector base 107 to attract particles 111.

Figure 2:
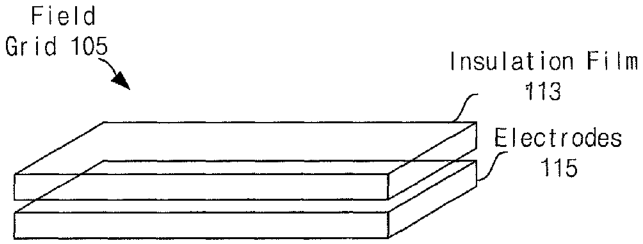
FIG. 2 illustrates a field grid, in accordance with embodiments of the present disclosure.

FIG. 2 illustrates the layers of an example field grid 105, in accordance with some embodiments of the present disclosure. Field grid 105 may include a plurality of electrodes 115 and an insulation film 113. In some embodiments, power source 117 may apply voltages to electrodes 115 to charge particles 111 and/or generate a moving E-field for moving charged particles 111 to collector base 107, as discussed below. Insulation film 113 may comprise any material that may resist electric current and may prevent or reduce the E-field from redistributing charges applied to particles 111.

Figure 3A:
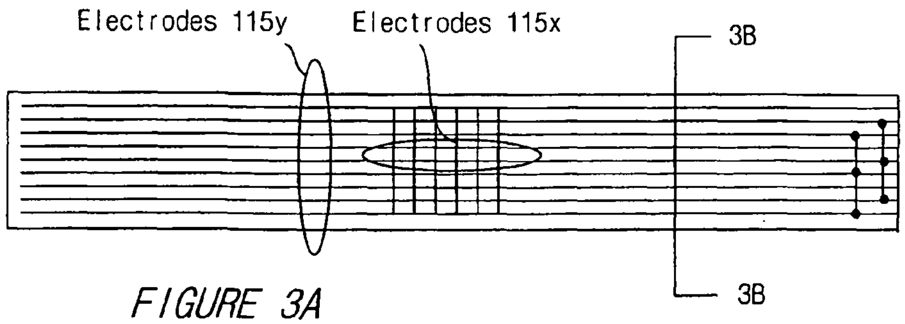
FIGS. 3A and 3B illustrate a top view and a cross-sectional view respectively of a plurality of electrodes of a field grid, in accordance with embodiments of the present disclosure.
Figure 3B:
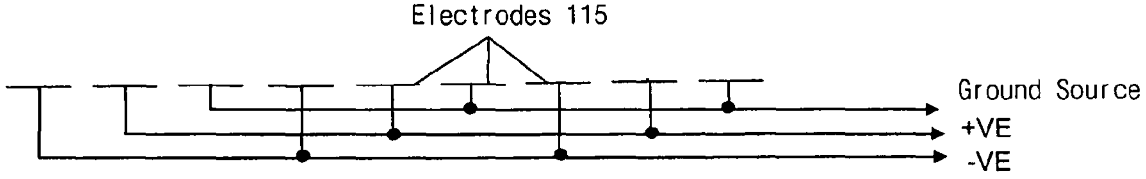

FIGS. 3A and 3B illustrate a top view and a cross-sectional view respectively of a plurality of electrodes 115 in field grid 105, in accordance with embodiments of the present disclosure.

As shown in FIG. 3A, electrodes 115*x* may be configured in a first, "vertical" orientation and electrodes 115*y* may be configured in a second, "horizontal" orientation perpendicular to the first orientation. Electrodes 115 may include only vertical electrodes 115*x*, only horizontal electrodes 115*y*, or a combination of both. Electrodes may also be configured and orientated in any other direction suitable to move particles 111 from between glass layer 101 and electrostatic particle removal system 102 to collector base 107.

Some of electrodes 115 may be coupled to a ground source, while others may be coupled to a positive voltage source (+VE) or a negative voltage source (−VE). The voltages applied to electrodes 115 by power source 117 may be varied (e.g., alternating between a positive voltage and a negative voltage) to generate a moving E-field that moves particles 111 in the direction of the moving E-field, as discussed in greater detail below with respect to FIGS. 8A through 8D.

Figure 4:
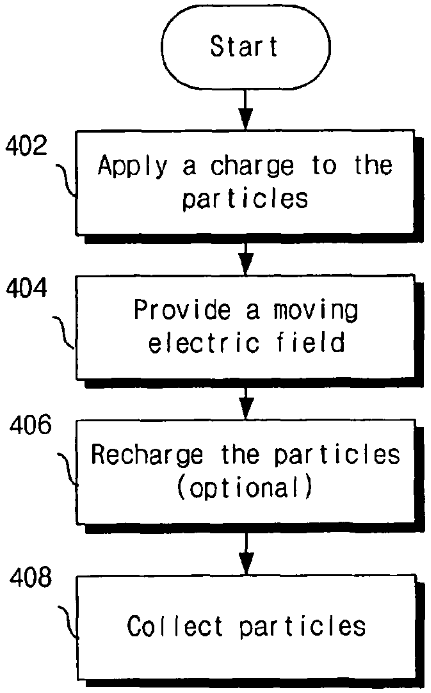
FIG. 4 illustrates a flowchart of a method for removing particles from an imaging system, in accordance with embodiments of the present disclosure.

FIG. 4 illustrates a flowchart of an example method for removing particles 111 from between glass layer 101 and electrostatic particle removal system 102, in accordance with some embodiments of the present disclosure. At step 402, induction grid 103 and/or field grid 105 may induce one or more charges on particles 111 located below glass layer 101. The applied charge(s) may create substantially positive and/or substantially negative charged particles 111, as discussed in more detail with respect to FIGS. 5 and 6. The induction of particles 111 may result in particles having a single charge (e.g., a substantially positive charge or a substantially negative charge).

At step 404, power source 117 may apply a voltage to certain electrodes 115 of field grid 105 to generate a moving E-field. Under the influence of the E-field, particles 111 may be moved toward a desired area (e.g., collector base 107). In one embodiment, the moving E-field may be applied in various directions across the plane between glass layer 101 and electrostatic removal system 102. The movement of particles 111 caused by a moving E-field is described in more detail with respect to FIGS. 7 and 8A through 8D.

At step 406, some or all of charged particles 111 may begin to neutralize (e.g., the single charge may dissipate or particle 111 may pick up other charges) over time as they move along with the applied E-field. In order to facilitate the continued movement of particles 111, induction grid 103 and/or field grid 105 may apply a supplemental charge to particles 111 to "recharge" particles 111. For example, one, some, or all of electrodes 115 may be grounded in order to transform particles 111 to a single charge polarity. In the same or alternative embodiments, induction grid 103 and/or field grid 105 may apply one or more charges to particles 111, as described in more detail with respect to FIGS. 5 and 6. Step 406 may be optional, depending on the particular embodiment or implementation.

Figure 9:
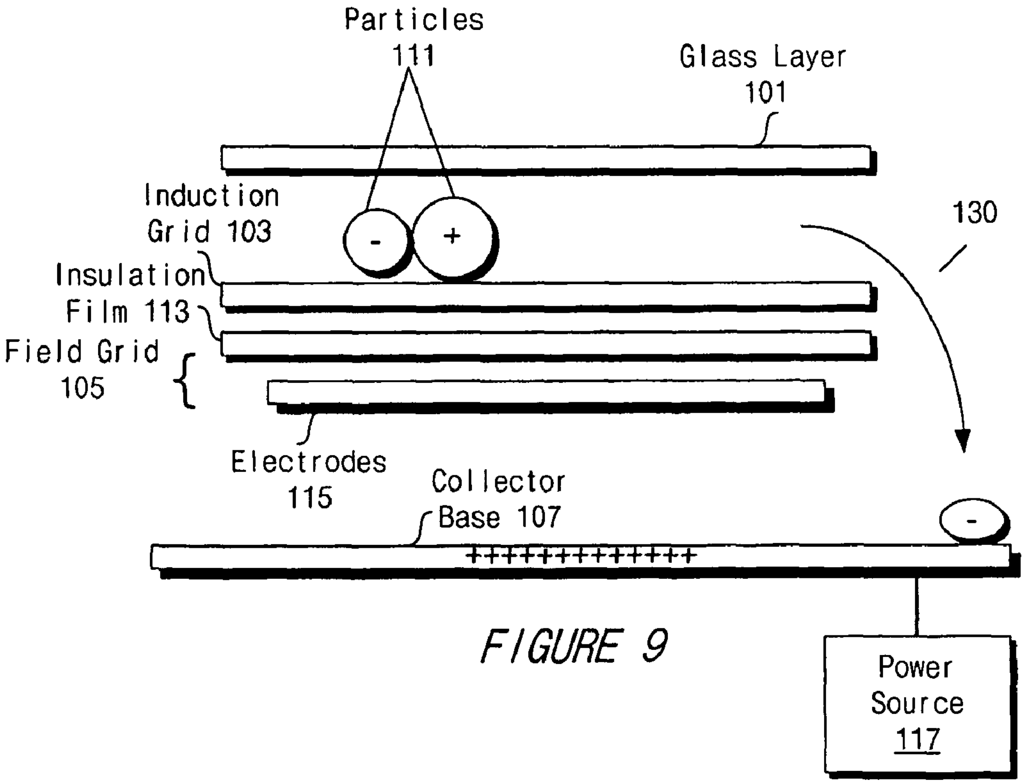
FIG. 9 illustrates collecting particles moved by an E-field, in accordance with embodiments of the present disclosure.

At step 408, particles 111 may be collected after being moved by the moving E-field. For example, particles 111 may be moved beyond an edge of field grid 105 and onto or into collector base 107, as shown in FIG. 9. In some embodiments, collector base 107 may include a static charged pad with a voltage applied by power source 117, which may attract particles 111. The voltage (e.g., a constant voltage or a static voltage) applied to collector base 107 by power source 117 or other source of voltage may be used to keep particles 111 in collector base 107 with a constant charge attraction.

Steps 402, 404, 406, and 408 of FIG. 4 may be repeated as necessary. In one embodiment, at the initiation of the particle removing technique, and in particular at step 402, induction grid 103 and/or field grid 105 may apply a first charge to particles 111. Next, a second charge may be applied to particles 111. Steps 404, 406, and 408 may be performed and repeated any number of times to ensure that all particles 111 with different inherent charge properties (e.g., negative charge particles and/or positive charge particles) are removed from underneath glass layer 101.

Figure 5:
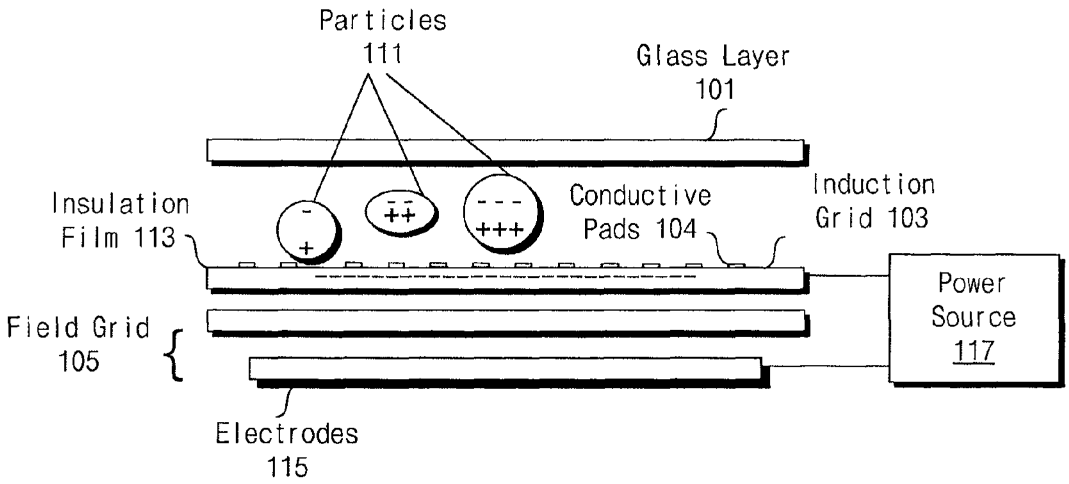
FIGS. 5 and 6 illustrate inducing a charge to one or more particles, in accordance with embodiments of the present disclosure.
Figure 6:
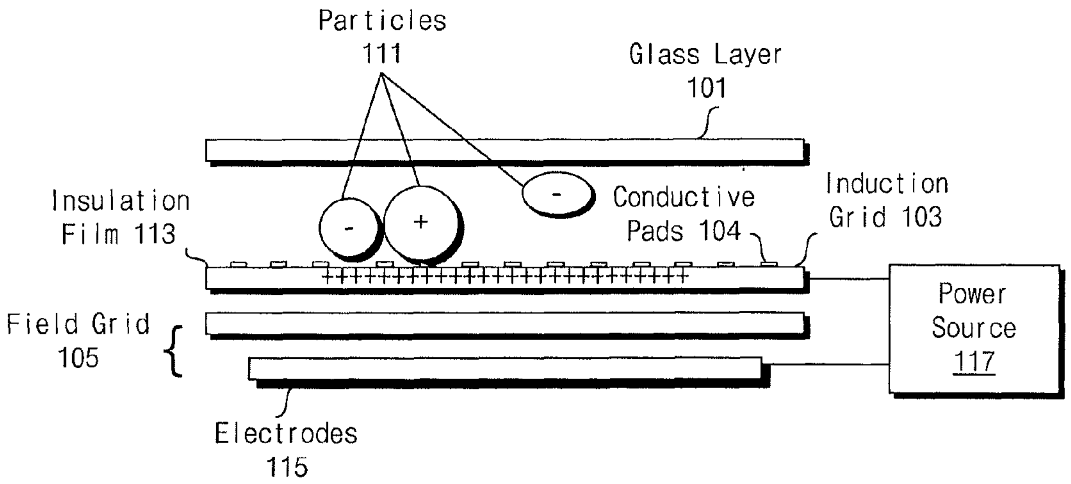

FIGS. 5 and 6 illustrate inducing a charge in particles 111 by induction grid 103, where power source 117 may apply a charge to the conductive pads 104 of induction grid 103. In the same or alternative embodiments, field grid 105 may apply a charge to particles 111. Power source 117 may apply a charge to one, some, or all electrodes 115 associated with field grid 105. The charge may be a single polarity voltage applied to one, some, or all electrodes 115.

For example, FIG. 5 shows a negative charge applied by induction grid 103. The applied charge may polarize neutral particles 111, e.g., particles having both the same number of positive and negative charges. In other words, the charge applied by induction grid 103 may cause a charge redistribution in neutral particles 111, such that there is a concentration of negative charges in one region of particles 111, and a concentration of positive charges in another (generally opposite) region of particles 111. As shown in FIG. 5, the positive charges of particles 111 are attracted to the negative charge applied by induction grid 103, while the negative charges of particles 111 are repelled from the negative charge applied by induction grid 103. As the positive and negative charges are attracted to or repelled from the negative charge applied by induction grid 103, the distance between the negative charges and the positive charges of particles 111 increases and thus the attraction force between these positive and negative charges of neutral particles 111 decreases or weakens.

FIG. 6 illustrates applying a second voltage to polarized particles 111. The second voltage may be the opposite of the voltage applied in FIG. 5. In some embodiments, induction grid 103 may induce a charge to polarized particles 111, where a charge may be applied by power source 117 to the conductive pads 104 of induction grid 103. In the same or alternative embodiments, the second voltage may be applied to one, some, or all electrodes 115 of field grid 105. For example, in one embodiment, a pulse or sinusoidal AC waveform such as a 1-kilovolt at 1-kilohertz sinusoidal waveform may be provided by power source 117 to one, some, or all electrodes 115. It is noted that the voltage range and frequency of the applied pulse or sinusoidal AC waveform may vary for different systems and for different particles.

The second charge applied by induction grid 103 and/or field grid 105 may cause the negative and positive charges of particles 111 to redistribute. During the redistribution of the negative and positive charges, particles 111 may come in contact with other particles 111, glass layer 101, insulation film 113, etc., which may cause charges (e.g., negative and/or positive) to be exchanged to or from particular particles 111, a phenomenon known as the triboelectric effect. In some instances, the contact may allow particles 111 to keep extra charges and/or give charges away. Depending on the material makeup of particles 111, the exchange of charges to and from particular particles 111 may cause such particles 111 to become positively charged particles or negatively charged particles (i.e., single charged particles).

Figure 7:
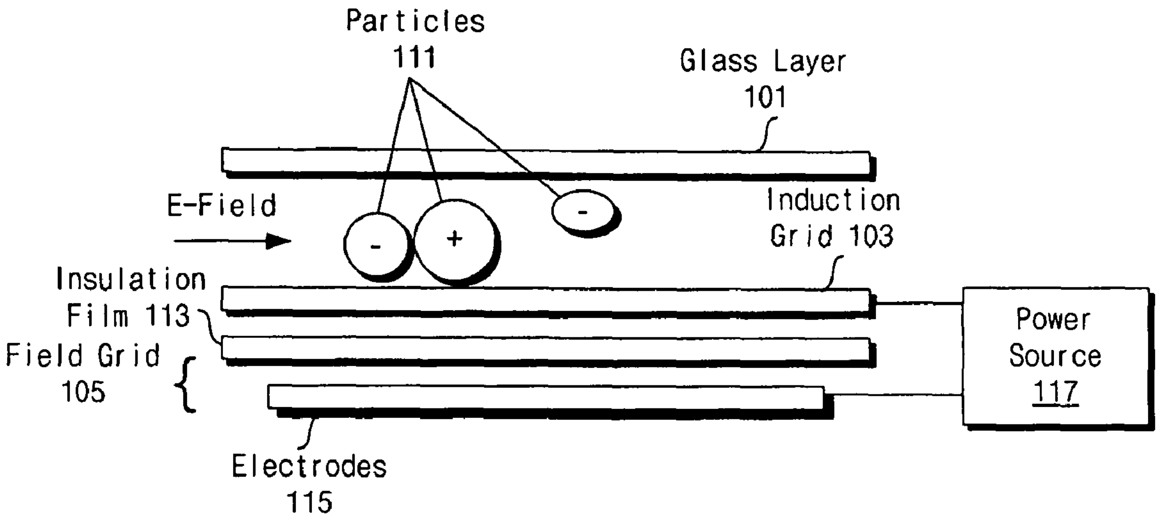
FIG. 7 illustrates applying an E-field to charged particles, in accordance with embodiments of the present disclosure.

FIG. 7 illustrates applying an E-field to single charged particles 111. The E-field may be generated by a direct current (DC) or alternating current (AC) applied to electrodes 115 via power source 117. For example, a 3-phase AC field may be applied to one, some, or all electrodes 115 which may move particles 111 in one or more direction in the plane between glass layer 101 and electrostatic particle removal system 102.

Figures 8A, 8B, 8C, 8D:
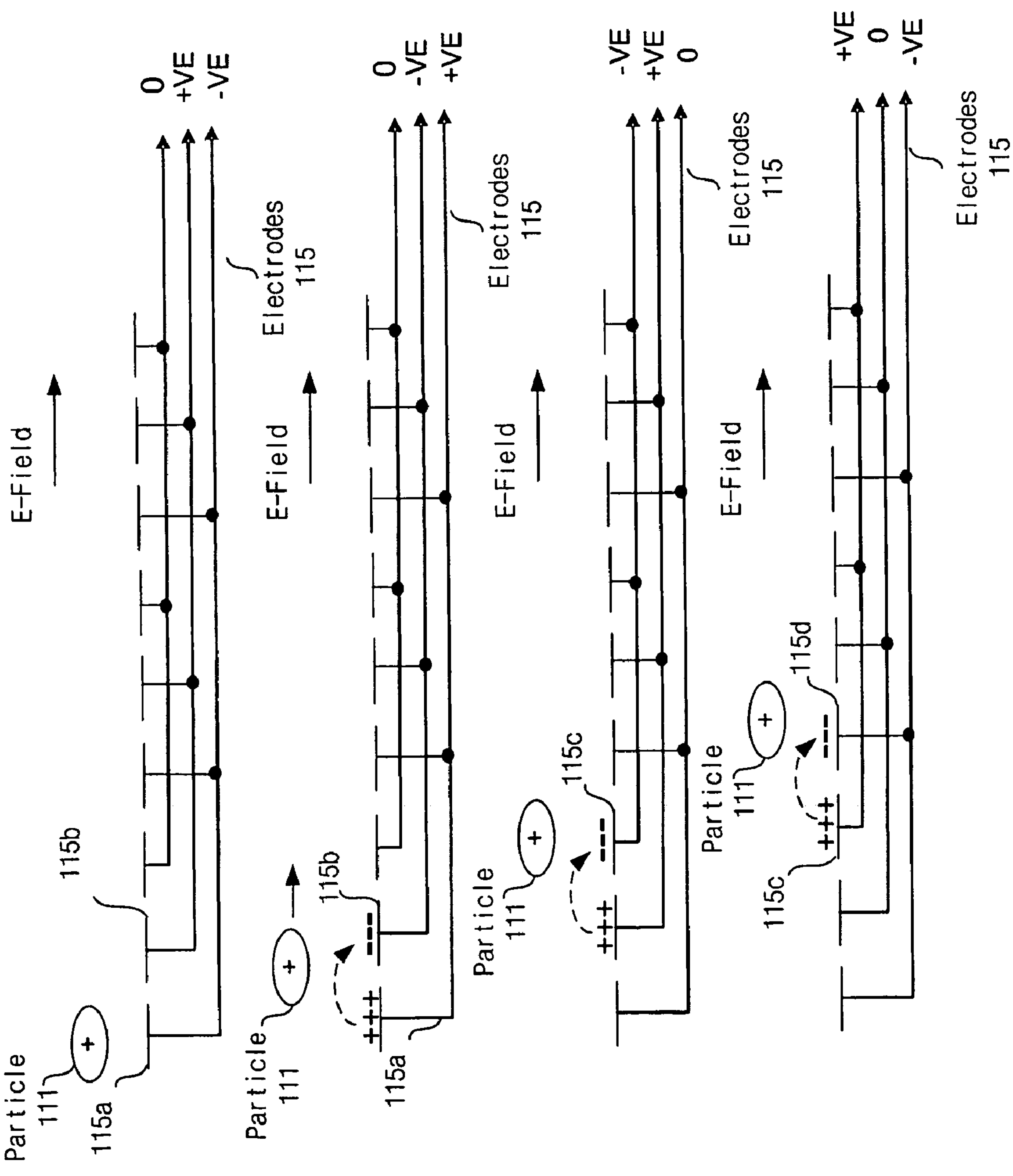
FIGS. 8A through 8D illustrate moving charged particles using the E-field applied in FIG. 7, in accordance with embodiments of the present disclosure.

FIGS. 8A through 8D illustrate moving a particle 111 using a moving E-field, in accordance with embodiments of the present disclosure. FIG. 8A shows a positively charged particle 111. A voltage pattern applied to electrodes 115 may form a moving E-field that may guide the particle 111 in a desired direction. The voltage pattern may include sequentially alternating the voltage applied to a series of electrodes 115 to move the particle 111 along.

FIG. 8A shows a negative charge applied to a first electrode 115*a* and a positive charge applied to a second electrode 115*b*. Positively charged particle 111 is attracted to electrode 115*a* and repelled by electrode 115*b*.

FIG. 8B shows a technique for moving particle 111 from first electrode 115*a* to second electrode 115*b*. In particular, a positive charge is now applied to first electrode 115*a* and a negative charge is now applied to second electrode 115*b* such that positively charged particle 111 is attracted to second electrode 115*b* and repelled from first electrode 115*a*, which causes the particle 111 to move toward second electrode 115*b*.

Alternating positive and negative charges may be similarly applied to electrodes 115*c* and 115*d* in order to move the particle 111 along the direction of the E-field, as shown in FIGS. 8C and 8D.

The techniques shown in FIGS. 8A through 8D may be used to move particles 111 in any direction across the plane between glass layer 101 and electrostatic particle removal system 102. This process may be repeated any number of times, using any pattern of charges, to move various particles 111 toward collector base 107.

FIG. 9 illustrates collecting particles 111 in accordance with embodiments of the disclosure. The E-field may move particles 111 outside a boundary of induction grid 103 and/or field grid 105. The static charge of collector base 107 may attract particles 111, thus removing particles 111 from underneath glass layer 101 and/or out of an imaging area of imaging device 100, as indicated by arrow 130.

The contactless cleaning technique and cleaning apparatus of the present disclosure may substantially reduce the introduction of contaminants to the imaging device as compared to current techniques, which typically remove the particles by manually applying a brush across the glass surface. Further, the contactless cleaning techniques and apparatuses discussed herein may provide for an automated, non-mechanical means for cleaning the imaging device. The techniques may be applied after some or every use of the imaging device. In some embodiments, the techniques may be automated. For example, a controller coupled to the cleaning apparatus may schedule regular cleaning times for the imaging device.

The techniques and apparatuses of the present disclosure may be configured for any imaging device. In some embodiments, the apparatus may be mounted underneath a glass layer of a printer, copier, or scanner. For example, the apparatus may be coupled to an auto sheet feeder of a scanner, printer, or copier. Similarly, the apparatus may be coupled to a laser beam output of a laser printer to remove for example, toner dust from the protective glass of the laser.

Although the present disclosure has been described in detail, it should be understood that various changes, substitutions, and alterations can be made hereto without departing from the spirit and the scope of the invention as defined by the appended claims.

What is claimed is:

1. An imaging device, comprising:
- a power source;
- a glass layer; and
- an electrostatic particle removal system associated with the glass layer and the power source, the electrostatic particle removal system comprising:
  - an induction grid layer including a plurality of conductive pads, the induction grid layer configured to:
    - polarize a plurality of neutrally charged particles located between the glass layer and the electrostatic particle removal system to form a plurality of polarized particles in response to the power source applying a first voltage to the induction grid layer; and
    - alter at least some of the polarized particles from neutrally charged particles to negatively or positively charged particles without any coronal discharge in response to the power source applying a second voltage to the plurality of conductive pads;
  - a field grid layer configured to provide an electric field for moving the charged particles; and
  - a collector base configured to collect the charged particles moved by the electric field.

2. The imaging device of claim 1, wherein the field grid layer comprises:
- a plurality of electrodes configured to generate the electric field; and
- an insulation film configured to prevent redistribution of the polarized particles by the induction layer.

3. The imaging device of claim 1, wherein the field grid layer comprises a vertical field grid or a horizontal field grid.

4. The imaging device of claim 1, wherein the field grid layer is configured to provide a moving electric field.

5. The imaging device of claim 1, wherein a third voltage is applied to the collector base to attract the charged particles.

6. The imaging device of claim 1 comprising a printer, a scanner, a copier, a fax, or any combination thereof.

7. A method, comprising:
- applying a first voltage to an induction layer to polarize a plurality of neutrally charged particles located between a glass layer of an imaging device and an electrostatic particle removal system to form a plurality of polarized particles;
- applying a second voltage to a plurality of conductive pads in the induction layer to alter at least some of the polarized particles from neutrally charged particles to negatively or positively charged particles without any coronal discharge;
- generating a moving electric field to move the charged particles; and collecting the charged particles moved by the moving electric field.

8. The method of claim 7, wherein generating a moving electric field comprises applying an alternating current field or a direct current electric field to electrodes of the electrostatic particle removal system.

9. The method of claim 7, further comprising sustaining the second voltage during application of the moving electric field.

10. The method of claim 7, wherein collecting the charged particles comprises applying a third voltage to a collector base of the electrostatic particle removal system.

11. A method, comprising:
- applying a first voltage to an induction grid for polarizing a plurality of neutrally charged particles to form a plurality of polarized particles;
- applying a second voltage to a plurality of conductive pads in the induction grid for altering at least some of the polarized particles from neutrally charged particles to negatively or positively charged particles without any coronal discharge;
- applying a third voltage to a plurality of electrodes in a field grid to generate an electric field for moving the charged particles; and
- applying a fourth voltage to a collector base to attract the charged particles moved by the electric field.

12. The method of claim 11, wherein applying the third voltage to the plurality of electrodes comprises providing a direct current waveform or an alternating current waveform at a predetermined voltage.

13. The method of claim 11, wherein applying the third voltage to the plurality of electrodes generates the electric field in a horizontal direction, a vertical direction, or a combination of a horizontal and vertical direction.

14. The method of claim 11, wherein applying the third voltage to the plurality of electrodes comprises applying the third voltage to a vertical array of electrodes or a horizontal array of electrodes.

15. The method of claim 11, wherein applying the second voltage to the plurality of conductive pads in the induction grid comprises applying a pulse alternating current waveform or a sinusoidal alternating current waveform at a predetermined voltage.

16. The method of claim 11, wherein applying the fourth voltage to the collector base comprises applying a substantially constant voltage.

17. The method of claim 11, wherein applying the second voltage to the plurality of conductive pads in the induction grid comprises applying a constant voltage.

* * * * *